Patented Oct. 21, 1924.

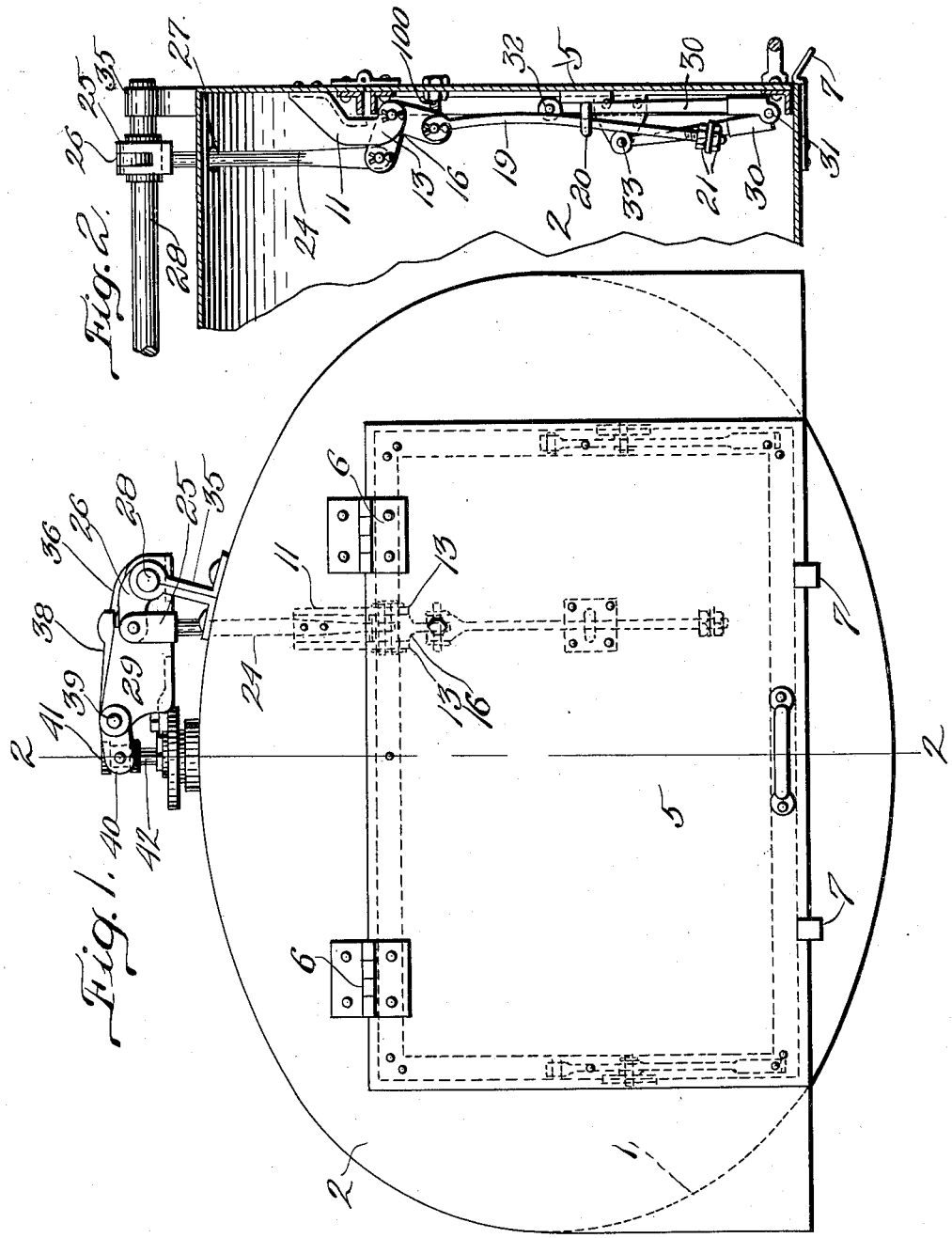

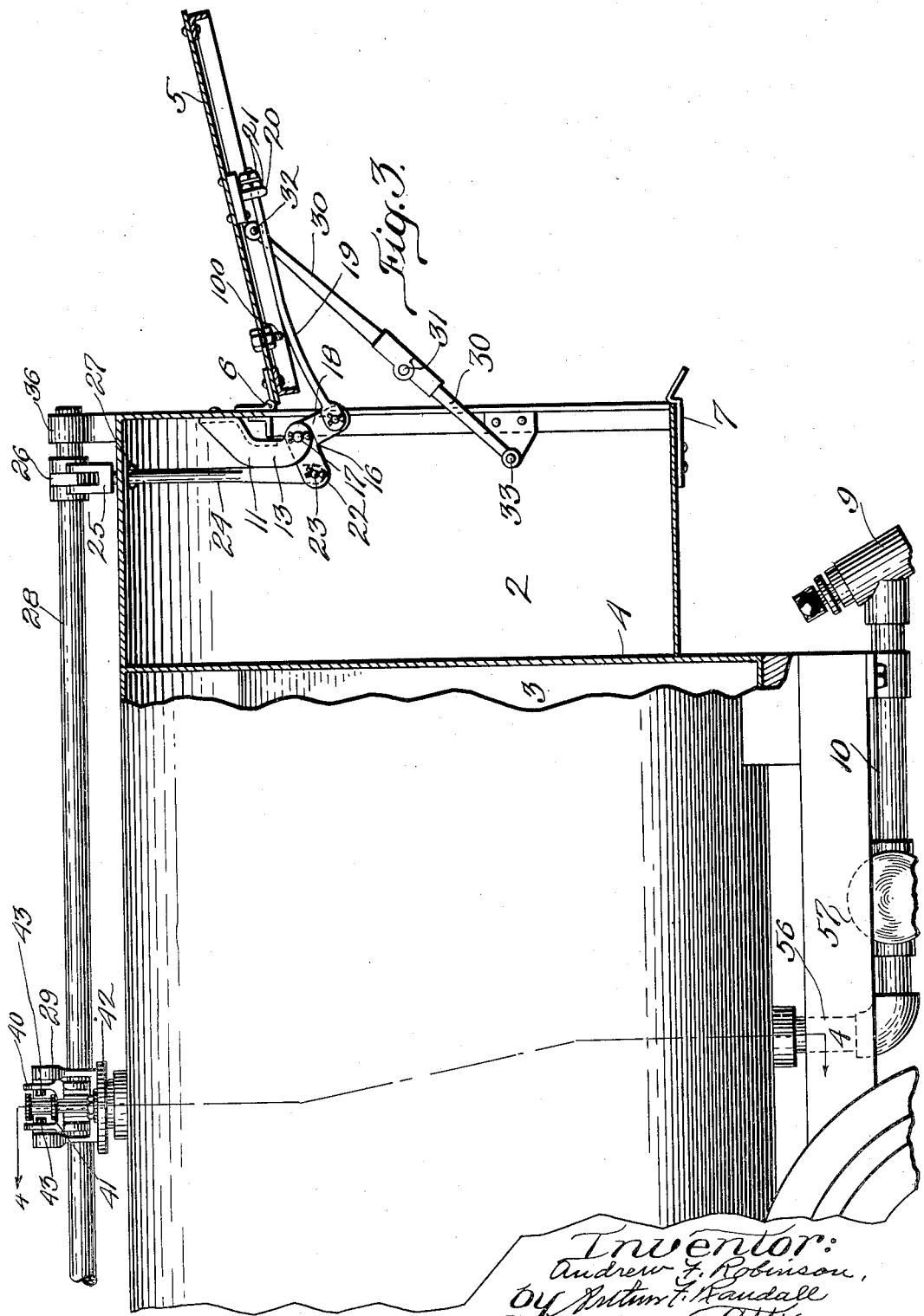

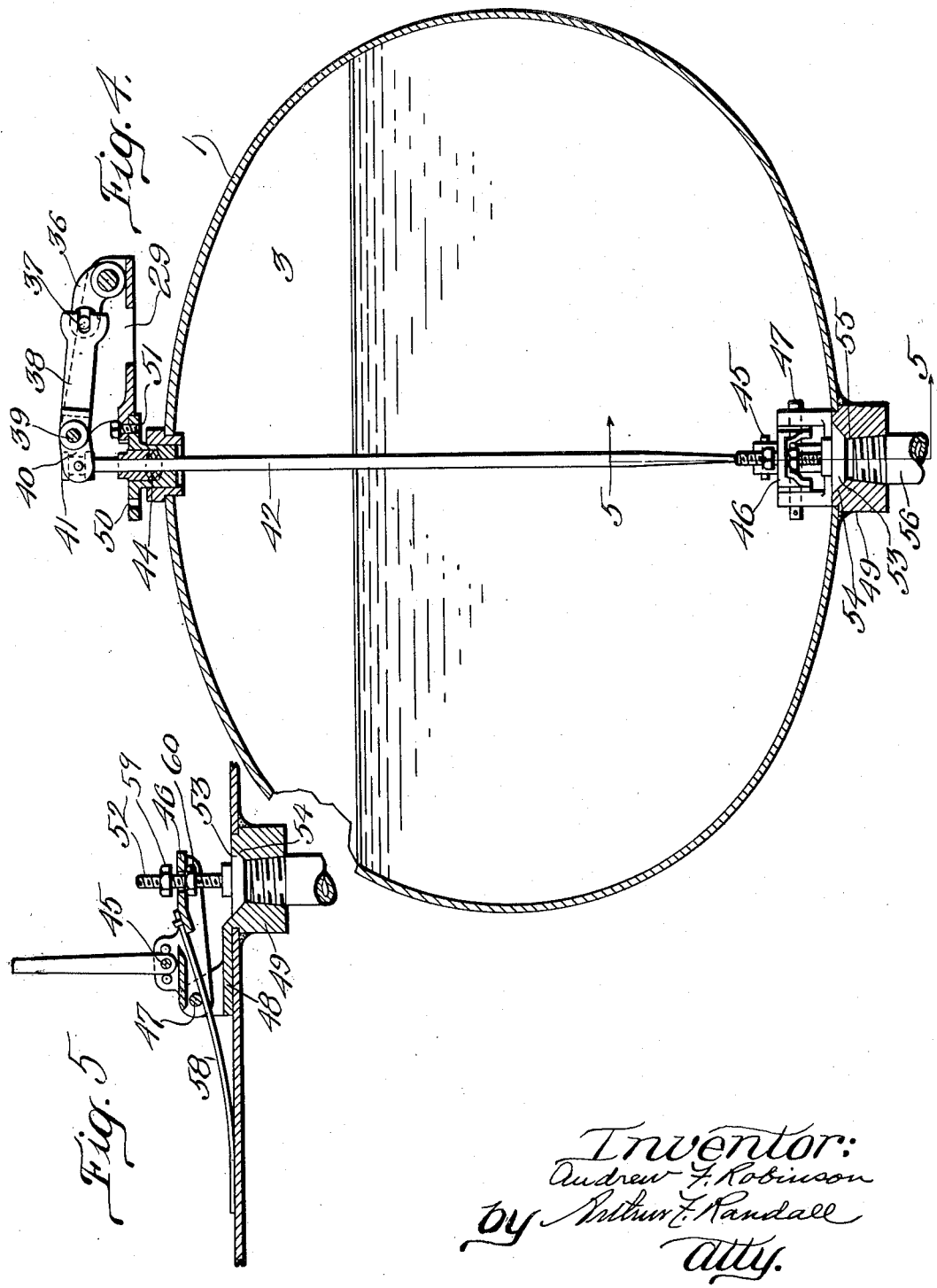

1,512,638

UNITED STATES PATENT OFFICE.

ANDREW F. ROBINSON, OF ARLINGTON, MASSACHUSETTS, ASSIGNOR TO STANDARD OIL COMPANY OF NEW YORK, OF NEW YORK, N. Y., A CORPORATION OF NEW YORK.

TANK WAGON.

Application filed October 15, 1921. Serial No. 508,008.

*To all whom it may concern:*

Be it known that I, ANDREW F. ROBINSON, a citizen of the United States, residing at Arlington, in the county of Middlesex and State of Massachusetts, have invented certain new and useful Improvements in Tank Wagons, of which the following is a specification.

This invention relates to vehicles of that class commonly called tank wagons, and it has for its object to improve the construction thereof. Particularly my invention has for its object to provide an improved tank wagon of the kind shown and described in my application filed March 19, 1920, Serial No. 367,252.

Tank wagons of the class referred to are constructed with a compartment at the rear end of the body for holding the portable measures by means of which deliveries are made and this compartment is provided with a closure which controls the main shut-off valve controlling the outlet of the tank body. Part of the mechanism through which the door controls the shut-off is located within the measure compartment and an objectionable feature of this mechanism as heretofore provided was that it has been so constructed as to interfere somewhat with the measures stored within the compartment. The present invention consists in certain improvements which simplifies the construction of the mechanism that is within the compartment and renders it more compact so that it does not interfere with the measures.

In the accompanying drawings:

Figure 1 is an elevation of the rear end of the body of a tank wagon constructed in accordance with my invention;

Figure 2 is a partial section on line 2—2 of Figure 1;

Figure 3 is a side view partly in section of the rear end portion of the wagon;

Figure 4 is a section on line 4—4 of Figure 3;

Figure 5 is a section on line 5—5 of Figure 4.

Wagons or vehicles of the class to which my invention relates comprise a tank body 1 made from sheet metal constructed at its rear end with a compartment 2 within which are stored the measures or other vessels used in making deliveries to customers, said compartment being separated from the liquid holding compartment 3 by a partition or wall 4. The compartment 2 is normally closed as usual, by a door 5 connected by hinges 6 with body 1, spring latches 7 on body 1 serving to lock said door in closed position. Just below the compartment 2 are the usual faucets 9 connected by pipes 10 with the liquid holding compartment 3. Upon arriving at a place of delivery the driver depresses latches 7, opens door 5, removes from compartment 2 the measures he is to use, draws off the required amount of liquid at faucets 9 and delivers the same to the customer, replaces the measures within compartment 2, and, after closing the door 5, moves on to the next place of delivery. As will be clear it is necessary for the driver to open door 5 in order to obtain the measures and it is also necessary for him to close the door 5 after replacing the measures in order to avoid loss of the same while traveling over the road.

In carrying out my invention I provide, within compartment 2, a bracket 11, riveted, or otherwise secured, to the inner side of the rear wall 12 of body 1 just above the door 5. This bracket 11 is made with a pair of downwardly projecting arms 13 which embrace the hub of a bell crank lever 16 pivoted at 17 to said arms. One arm 18 of bell crank 16 has pivotally connected with it one end of a link 19 which extends through an eye 20 secured to the inner side of door 5, and near its free end this link 19 is threaded and has mounted thereon two nuts 21 to co-operate with eye 20. When the door 5 is swung outwardly and upwardly on its hinges 6 the eye 20 is brought into engagement with the nuts 21, and acts through link 19 to operate bell crank 16. As will be clear from Figures 2 and 3 the eye 20 slides along the link 19 away from the nuts 21 when the door 5 is moved from its open position to its closed position. The other arm 22 of bell crank 16 is connected through a pin 23 with the lower end of a connecting rod 24 whose upper end is provided with a yoke 25 pivotally connected with an arm 26. The lower portion of the connecting rod 24 is within the compartment 2 and said rod extends upwardly through an opening 27 provided in the body 1 to the arm 26 which is upon the exterior of the body. The arm 26 is fastened on the rear end portion of a rock shaft 28 which extends horizontally lengthwise of the tank body 1. The rear end of rock shaft 28 is journalled in a bracket 29 secured to the top of tank body 1, while forward of said bracket 29 the rockshaft is journalled in another bracket 35, see Figs. 3 and 4. Adjacent bracket 35 the shaft 28 is provided with an arm 36 having a pin and slot connection 37 with one arm of a lever 38 fulcrumed at 39 upon bracket 29. The other arm 40 of lever 38 is bifurcated and straddles a collar 41 fast upon the upper end of a link 42, said collar being made with an annular groove into which project studs 43 on arm 40.

It will now be clear that when the door is swung from its closed position shown in Figure 2 into its open position shown in Figure 3 the eye 20 slides towards the end of link 19 and acts through said link, bell crank 16, link 24, arm 26, rock shaft 28, arm 36 and lever 38, to move link 42 upwardly. This link 42 extends downwardly from lever 38, through a stuffing box 44, into compartment 3, of tank body 1, to near the bottom of the latter where its lower end is pivotally connected by a pin 45, Fig. 5, with a valve actuating lever 46. Lever 46 is fulcrumed at 47 upon an arm 48 forming part of a valve body 49 that occupies a hole provided in the bottom of the tank to which latter said body may be brazed, welded, or otherwise secured. The stuffing box 44 is made with a radially extending annular flange 50 to which the bracket 35 is fastened by means of a screw 51, the body portion of said stuffing box being exteriorly threaded and screwed into a threaded opening in the top of tank 1.

Near its free end the lever 46 is made with a hole through which extends the threaded stem 52 of the shut-off valve 53, the latter being adapted to close downwardly onto a seat 54 provided upon body 49. Nuts 59, 60, upon said threaded stem are engaged by the lever 46 for the actuation of the valve. Valve 53 controls an outlet port 55 formed through body 49 and connected by a delivery pipe 56 with a manifold 57 to which the faucets 9 are connected each by a pipe 10.

To the valve engaging lever 46 is fastened one end of a leaf spring 58 that extends under fulcrum pin 47 with its free end resting upon the bottom of tank 1 so that said spring is under a normal initial stress which holds shut-off valve 53 on its seat. The spring 58 is permitted to perform this function because of the fact that when the door is shut the nuts 21 are out of engagement with the eye 20.

It will thus be clear that when the door 5 is swung from its open position shown in Figure 3 to its closed position shown in Figure 2, the lever 46 and spring 58 act to lower the valve 53 onto its seat, the said valve 53 being automatically opened when the door 5 is swung into its open position and automatically closed when the door 5 is swung into its closed position.

As means for supporting the door 5 in its open position I have herein provided a pair of collapsible struts 30, 30, each consisting of two sections pivotally connected at their abutting inner ends by a knuckle joint 31 and at their outer ends said sections are pivotally connected as at 32 and 33 to the door 5 and body 1 respectively. When the struts 30 occupy their extended positions they rigidly support the door 5 in its open position, and it will be clear that by pushing outwardly upon the two struts the door 5 can be unlocked and closed downwardly, the two struts folding up within the compartment 2 as shown in Figs. 1 and 2.

My invention provides simple and reliable means for insuring the closing of shut-off valve 53 after each delivery, so that accidental or malicious opening of a faucet, or injury to a faucet or its pipes, cannot effect the discharge of the contents of the tank 1. Also, in the case of leaky faucets, wastage is prevented. An advantage to the construction above described is that the shut-off valve is operated by the driver through means within his reach from his position upon the ground at the rear of the vehicle. Another advantage is that the shut-off valve is automatically opened when the compartment door 5 is opened and is automatically closed when said compartment door is closed. Thus the driver, or person in charge, is relieved of the duty of either opening or closing the valve. Naturally the driver will close the door 5 upon completing a delivery and return the measures to the compartment 2, and will naturally, of necessity, open the door to secure his measures when about to make a delivery. It follows therefore that the shut-off valve will always be open when deliveries are being made and will always be closed while the vehicle is traveling over the road. Preferably I arrange the bell crank lever 16 so that should, for any reason, the spring 58 fail to close the valve 53 when the door 5 is closed, then a stud 100 on said door will act through said lever 16 and parts connected with the latter to positively return the valve 53 to its closed position. The shut-off valve of the construction above described being automatically closed, none of the contents of the tank 1 can leak out if either the faucet or the delivery line itself is damaged. It sometimes happens that while "on the road" a faucet starts to leak because of the seat of the faucet valve becoming worn. These seats are made of textile fabric composition and occasionally give out, so that if the shut-off valve is open there is leakage at the faucet. This leakage cannot occur with the construction above described. Where the shut-off valve operating means is located on top of the tank the same is operated infrequently, so that when it is necessary to close said valve as in the case of damage to the faucet or pipe line, said means is sometimes found to stick, therefore becoming "frozen." Constant use of the valve operating means of my improved construction keeps the same in perfect working condition.

What I claim is:

1. A tank wagon having, in combination, a body provided with an outlet; a shut-off valve controlling said outlet; a compartment; a movable closure for said compartment; a shut-off valve operating lever; means connecting said lever with said shut-off valve; a link pivotally connected with said lever, and means connecting said link with said closure through which movement of said closure in one direction acts through said link to operate said lever in a direction to open the shut-off valve.

2. A tank wagon having, in combination, a body provided with an outlet; a shut-off valve controlling said outlet; a compartment; a movable closure for said compartment; a shut-off valve operating lever arranged within said compartment; means connecting said lever with said shut-off valve, and a link pivotally connecting said lever with said closure through which the latter operates said lever.

3. A tank wagon having, in combination, a body provided with an outlet; a shut off valve controlling said outlet; a compartment, a movable closure for said compartment; a shut-off valve operating bell crank lever arranged within said compartment; means connecting one arm of said bell crank lever with said shut-off valve; a link pivotally connected with the other arm of said bell crank lever; an eye on said closure in which said link is slidably mounted, and stops on said link co-operating with said eye.

4. A tank wagon having, in combination, a body provided with an outlet; a shut off valve controlling said outlet, a compartment; a movable closure for said compartment; a shut-off valve operating bell crank lever arranged within said compartment; means connecting one arm of said bell crank with said shut-off valve; a link connected with the other arm of said bell crank lever; an eye on said closure in which said link is slidably mounted, and stops on said link co-operating with said eye; said closure engaging said bell crank lever to positively seat the shut-off valve when said closure is moved into its fully closed position.

In testimony whereof I have affixed my signature.

ANDREW F. ROBINSON.